UNITED STATES PATENT OFFICE 2,372,259

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application June 23, 1943, Serial No. 492,185

9 Claims. (Cl. 252—340)

The invention relates primarily to the resolution of petroleum emulsions.

One object of our invention is to provide a novel process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or weak brines. Controlled emulsification and subsequent demulsification under the conditions just mentioned is of significant value in removing impurities, particularly inorganic salts from pipe line oil.

The demulsifying agent employed in our process consists of sub-rubbery polymeric sulfur converted polyhydric alcohol esters of the kind in which there was originally present at least two detergent-forming acid radicals, each of which contains at least one ethylene linkage. The preferred detergent-forming acids are higher fatty acids. The preferred esters are naturally-occurring glycerides, particularly monoethylenic glycerides. The preferred oxyalkylating agent is ethylene oxide.

In a somewhat broader aspect, our preferred demulsifying agents are oxyalkylation derivatives of sub-rubbery polymeric sulfur converted esters of a polyhydric alcohol, and more particularly, an ester in which there is present at least two acyl radicals derived from unsaturated high molal monocarboxy detergent-forming acids having at least 8, and not more than 32 carbon atoms each.

It is known that when elemental sulfur is heated with a reactive detergent-forming carboxylic acid, for example, with oleic acid, the sulfur adds at the double bond in the oleic acid chain or radical. Where the oleic acid is employed in combination with a polyhydric alcohol, such as glycerol, as, for example, in tri-olein, which is the tri-glyceride of oleic acid, the reaction apparently does not stop with the formation of a simple addition product. Instead, as discussed in the literature, e. g., Knight & Stamberger, J. Chemical Society, London, 1928, pages 2791–8, tri-olein takes up additional sulfur atoms, possibly even tied in through the glyceryl radical. Also, it is probable that the several fatty acid radicals present are also linked through sulfur atoms. Compare comparable reactions involving more reactive sulfur dichloride, and particularly, the formation of cyclic bisulfides. Such reactions indicate the rationale for thioglycerol formation, or more exactly, the formation of sulfurized esters of thioglycerol. See "Chemistry of Synthetic Resins," Ellis, 1935, volume 2, pages 1176–77. At any rate, in the course of the reaction polymers begin to be formed and a certain degree of elasticity becomes apparent. Molecular weight determinations show the presence of polymers, including diads and triads (dimers, trimers), etc. Destruction of the polymeric body, for example, by saponification with alkali, results in a reduction of the molecular weight, loss of the elastic properties, and apparently a return to a simpler addition product. In our process, we make no claim to the use of the simple unpolymerized addition product of sulfur and an unsaturated high molal monocarboxylic detergent-forming acid having at least 8, and not more than 32, carbon atoms, typified by sulfurized oleic acid, as a reactant. We make no claim to the use of the free detergent-forming carboxylic acid and sulfur alone in preparing our reagent; but we employ the acid only in combination with a polyhydric alcohol compound containing two or more alcoholiform hydroxyl groups, in the form of an ester of such acid and such polyhydric alcohol.

The compound containing the two or more alcoholiform hydroxyl groups may be a simple polyhydric alcohol, such, for example, as glycerol or ethylene glycol, or it may be a condensed polyhydric alcohol like polyglycerol, diethylene glycol, diglycerol, or triglycerol. In addition to the above polyhydric alcohols, we may also use mannitan, sorbitan, pentaerythritol, and dipentaerythritol. We may use ether alcohols, so long as they have two or more hydroxyl groups in the molecule, i. e. (polyhydric alcohols in which a carbon atom chain is interrupted at least once by oxygen, as exemplified by diethylene glycol previously mentioned). They are all characterized by containing two or more alcoholiform hydroxyl groups, and by having the power to form esters with an unsaturated high molal monocarboxylic detergent-forming acid having at least 8, and not more than 32, carbon atoms.

Resinous and similar materials are sometimes classified as "thermoplastic," "thermo-setting," and "element-convertible." The expression "element-convertible" refers particularly to plastic coatings or drying oils, in which hardening apparently is due to conversion into a new compound or composition by action of an element used, often oxygen. Thus, drying oils are often referred to as being "oxygen-convertible." For practical purposes, the only other element finding wide application for this purpose is sulfur. Hence, certain products, and particularly certain oils, are referred to as "sulfur-convertible," meaning that they react with sulfur or sulfur dichloride to yield polymeric materials, rubbery masses, factice, or the like.

The unsaturated high molal detergent-forming mono-carboxylic acids employed in preparing our reagent, are characterized by having a carbon atom chain, which we shall denote as "R," containing at least 8 carbon atoms, and not more than 32 carbon atoms, and which must contain at least one unsaturated bond, i. e., at least, one ethylene linkage. Such acids are sometimes referred to as "ethylenic."

The acyl radical may, of course, have present other non-functional groups, such as hydroxyl groups, acyloxy groups, etc. It is only necessary that the presence of such groups does not detract from (a) the detergent-forming ability of the acids and (b) their susceptibility to sulfur conversion. Suitability of substituted acids is indicated by very simple tests. For instance, saponification with caustic potash, caustic soda, or the like, must yield a soap or soap-like material. Secondly, if the detergent-forming properties have not been eliminated by the presence of this substituent atom or radical, then it is only necessary to determine that susceptibility to sulfur conversion is still present. Such test is obviously the same procedure as is herein described for preparing our reagent, except that it is conducted on a small scale in the laboratory. If the substituted acid or ester which has been previously determined to have detergent-forming properties, also shows sulfur conversion susceptibility, it is, of course, the obvious functional equivalent of the unsubstituted or unmodified acids or esters herein described, and may be used with equal or even greater effectiveness.

Such high molal acids may be obtained from various sources, such as oils, fats, and waxes; or one may use petroleum acids, and the like. Petroleum acids include naturally-occurring naphthenic acids and also acids obtained by the oxidation of hydrocarbons and waxes. Rosin acids include abietic acid, pyroabietic acids, and the like. Saturated acids, such as saturated fatty acids, saturated naphthenic acids, saturated oxidized petroleum acids, etc., can frequently be converted into an unsaturated acid by halogenization, followed by a reaction of the kind exemplified by the internal Wurtz reaction. The 20 and 22 carbon atom acids of jojoba bean wax are suitable for conversion into an ester, to be used as a reactant.

Our preference, of course, is to use unsaturated fatty acids, due to their low cost and ready availability. One need not use a single fatty acid, but may use the mixture employed by saponification of a naturally-occurring oil or fat. For instance, special reference is made to the fatty acids which occur naturally in olive oil, castor oil, peanut oil, cottonseed oil, fish oils, corn oil, soyabean oil, linseed oil, sesame oil, lard oil, oleo oil, perilla oil, and many other naturally-occurring oils. Rapeseed oil, for example, contains appreciable proportions of tri-erucin, the tri-glyceride of erucic acid.

As has been previously pointed out, the high molal acids are used in the form of the polyhydric alcohol ester having at least 2 such high molal acid radicals present. Since it is our preference to use the naturally-occurring fatty acids, it obviously follows that our preference is to use the naturally-occurring glycerides. However, if desired, one can obtain the high molal acids from any source, and esterify such acids with various polyhydric alcohols, such as the glycols, in the conventional manner to produce suitable esters which may or may not have a free or unreacted alcoholiform hydroxyl group present. The fatty acid diglycerides typify these esters which contain a free or unreacted alcoholiform hydroxyl group (in the residue of the polyhydric alcohol, glycerol). The fatty acid tri-glycerides do not possess this free alcoholiform hydroxyl. Both types of glyceride, for example, are suitable for our purpose, provided the fatty acid present satisfies the above expressed requirements. The manufacture of such esters is so well known that no description is required in the present instance.

One may select esters of the mixed type, and such mixed esters may even contain acyl radicals which either are not high molal in character, or are not unsaturated, i. e., ethylenic in nature. For instance, di-olein may be reacted with one mole of acetic acid, or one mole of stearic acid to give an ester which would be satisfactory for the present purpose. As an example of a modified ester which may serve, reference is made to tri-acetylated triricinolein.

In those instances where an ester of a high molal detergent-forming acid of the type previously described is first reacted with a polycarboxylic acid, before any other step in the preparation of our reagent, possession of one or more alcoholiform hydroxyl groups is required to confer reactivity. If the ester by a triglyceride, for example, the detergent-forming acid must contain an alcoholiform hydroxyl group. Ricinoleic acid would satisfy the requirements in this case. If the ester be a diglyceride, the free alcoholiform hydroxyl group present in the glyceryl radical is sufficient to permit the diglyceride to meet the above requirement.

We have found that, in addition to naturally-occurring fatty acids, addition and substitution products of fatty acids, which latter modified fatty acids bear a simple genetic relationship to the parent fatty acids from which they were derived, are also useful for making our reagent, so long as they are in part unsaturated, i. e., possess some double bond, as shown by possession of an iodine number of appreciable magnitude, or, in those cases where a detergent-forming carboxylic acid is first reacted with a polycarboxylic acid in producing our reagent, only so long as they possess an alcoholiform hydroxy group also.

Instead of employing natural polyesters of reactive detergent-forming carboxylic acids in preparing our reagent, we may use synthetic esters obtained by esterifying one or more reactive detergent-forming carboxylic acids with a polyhydric alcohol of the kind heretofore recited and described in a conventional esterification reaction, such as reacting the alcohol with the acid or acids in various molecular proportions in the presence of, for example, dry hydrogen chloride.

The compound produced by the interaction of a polyhydric alcohol of the above kind and a reactive detergent-forming carboxylic acid of the above kind will be termed a "polyester" in the present description. In all instances, it must contain two or more radicals or residues derived from reactive detergent-forming carboxylic acids, which may be the same or different acids; and it contains one or more radicals or residues derived from polyhydric alcohols. Diglycerides of unsaturated fatty acids are examples of polyesters, just as are the naturally-occurring triglycerides of unsaturated fatty acids.

The reaction of elemental sulfur with such a polyester is at first one of simple addition of sulfur at the double bond in the chain R of an acid residue in such polyester to form a sulfurized derivative which does not differ greatly from the parent ester in properties. However, when the reaction is allowed to proceed at controlled temperatures, there is obtained a complex polymeric sulfurized product of high molecular weight, which is semi-elastic and highly viscous, and which approaches the consistency of rubber, depending upon the time and temperature of reaction and the proportions of reactants employed. Such reactant must be kept in the sub-rubbery stage.

The nature of the chemical changes which take place is, to the best of our knowledge, not yet fully understood. We have referred above to a literature reference which suggests various mechanisms for the polymerization process. Without attempting to express exactly the composition of the reagents we employ, we desire to use those polymeric sulfurized bodies, obtained as above recited, which have a consistency short of rubber. Accordingly, we have termed them "sub-rubbery" to denote a range of polymerization between the simple sulfur addition products, on one hand, and the non-usable rubbers produced on superpolymerization, on the other. Such sub-rubbery products are capable of dissolving in various solvents. We intentionally exclude sulfurized products of the kind intended as substitutes for rubber, that is, factices or similar material of a rubbery consistency. This latter type is insoluble in oil, but soluble in a very limited group of solvents at the best.

The preparation of the compounds or demulsifiers herein contemplated consists essentially of two separate steps, the first step being the sulfurization step of the kind previously described, and the second being the oxyalkylation step. In preparing the sulfurized compound to be subjected to oxyalkylation, our preference is to proceed approximately as follows: 125 parts by weight of castor oil are heated to 120° C., 15 parts by weight of sulfur are added and the mixture is stirred continuously for 45 to 60 minutes at 188 to 190° C., or until a sample withdrawn from the reaction vessel and cooled is semi-elastic and transparent, indicating the complete absence of unreacted sulfur. This product is sub-rubbery in nature.

As a second example, the following procedure is employed. 298 parts by weight of ricinoleic acid are mixed with 46 parts by weight of glycerol and the mixture is agitated and heated in the presence of dry hydrogen chloride gas at a temperature in excess of 100° C. for a period of time sufficient to produce an ester. We have found that reacting the mass for six hours at 150° C. is satisfactory to accomplish this purpose. If this procedure is tedious or undesirable, the diglyceride of ricinoleic acid may be prepared in any other desired manner. For example, diglycerides are commonly prepared by treating two moles of triglyceride with one mole of glycerol in the presence of an alkaline catalyst. The ester so produced or obtained in any other suitable manner is mixed with 15% its weight of elemental sulfur, and agitation and heat are continued until all sulfur is assimilated and a clear, transparent product is obtained, as shown by a test on glass.

As a third example, the same procedure is followed as in the preceding example, except that diolein is substituted for diricinolein.

Other esters of unsaturated fatty acids or other reactive detergent-forming carboxylic acids of the kind heretofore mentioned may be used instead of the castor oil and the ricinoleic acid. For example, we have used cottonseed oil instead of castor oil in making certain examples of our reagent, and have found it to be useful therein. However, when cottonseed oil is used, the reaction is not as smooth as when castor oil is employed. Also, it is usually found that longer heating is required to produce the desired reagent of optimum properties. It is, therefore, preferable to use castor oil, rather than cottonseed oil, so far as we are now aware.

The stages of polymerization and condensation and the elastic properties of the resulting products may be altered by varying the temperature of the reaction, the time of the reaction, or the proportions of reactants employed, or any combination of these variables. We have found that the most effective reagents are those obtained by reacting 100 parts by weight of the ester with from 10 to 17 parts by weight of sulfur, controlling the temperature to avoid the evolution of hydrogen sulfide, so far as is practicable and employing a time sufficient to obtain highly polymerized products which are, however, still soluble in petroleum distillates.

Having obtained a sulfurized compound or composition of the kind previously described, the product is subjected to oxyalkylation. A variety of reagents containing an ethylene oxide ring may be employed. As typical examples of applicable compounds, may be mentioned epichlorhydrin, glycide alcohol, ethylene oxide, propylene oxide, butene-2 oxide, butene-1 oxide, isobutylene oxide, butadiene oxide, butadiene dioxide, chloroprene oxide, isoprene oxide, decene oxide, styrene oxide, cyclohexylene oxide, cyclopentene oxide, etc. Our preference is to use an alkylene oxide having not more than four carbon atoms, as, for example, ethylene oxide, propylene oxide, butylene oxide, glycide or the equivalent.

Oxyethylation of high molal compounds is well known. For instance, acids, alcohols, amides, mercaptans, and the like, are readily susceptible to oxyethylation. The reaction involves a labile hydrogen atom. For example, a hydrogen atom attached to a nitrogen atom, an oxygen atom, or a sulfur atom. Oxyalkylation may involve other reactions. For instance, it is known that total esters will react readily with the ethylene oxide, and this is also true of certain carboxyl compounds not containing a labile hydrogen atom. Under more drastic conditions a carbon linked hydrogen atom may enter into reaction. The reaction can generally be hastened by the addition of a small amount of an alkaline catalyst, such as caustic soda, sodium acetate, sodium carbonate, sodium bicarbonate, or sodium methylate. Such reactions generally take place readily, and do not require excessive pressure. The steps employed in the present instance are substantially the same as those described in U. S. Patent No. 2,208,581, dated July 23, 1940, to Hoeffelman. The time of reaction varies with the amount of alkylene oxide absorbed. This is illustrated by the following examples:

Example 1

280 pounds of sulfurized triricinolein prepared in the manner previously described is treated with 34 pounds of ethylene oxide. This is in the approximate ratio of three moles of ethylene oxide for each mole of ricinoleic acid previously present in the form of a glyceride. If desired, ½% of sodium methylate may be added as a catalyst. The time employed is approximately 2 hours, and the temperature approximately 170° C. During the entire operation, the pressure never exceeds 100–200 lbs. gauge pressure.

Example 2

The same procedure is employed as in the preceding example, except that the amount of ethylene oxide per mole of the ricinoleic acid is doubled; to wit, 68 lbs. used instead of 34 lbs. This was added in two portions of 34 lbs. The time for completion of the oxyalkylation step is somewhat longer, being 3½ hours.

Example 3

The same procedure is followed as in the preceding examples, except that three times as much ethylene oxide is employed as in Example 1. This was added in 3 portions of 34 lbs. each. The time for completing the oxyalkylation step is somewhat longer, to wit, 8 hours.

Example 4

The same procedure is followed as in Examples 1, 2 and 3, preceding, except that sulfurized diricinolein is used instead of sulfurized triricinolein. The preparation of the sulfurized diricinolein has been described previously. The molal ratios of ethylene oxide to the ricinoleic radical, to wit, 3–1, 6–1 and 9–1, are preserved.

Example 5

The same procedure is followed as in Example 4, preceding, except that sulfurized diolein is substituted for sulfurized diricinolein in the preceding Example 4. Preparation of the sulfurized olein has been described previously.

Example 6

The same procedure is followed as in Example 4, preceding, except that sulfurized undecylenin, derived from 1 mole of glycerol and 2 moles of undecylenic acid is substituted for sulfurized diricinolein in the preceding Example 4.

Example 7

The same procedure is followed as in Example 4, preceding, except that sulfurized erucin, derived from 1 mole of glycerol and 2 moles of erucic acid, is substituted for sulfurized diricinolein in the preceding Example 4.

Example 8

Propylene oxide, butylene oxide, or glycide is substituted for ethylene oxide in Examples 1 to 5, preceding. Note that the use of propylene oxide requires longer time for oxypropylation and may require somewhat higher temperature. This is true to an even greater extent of butylene oxide. Glycide, on the other hand, reacts much more violently and may react with almost explosive violence, even at room temperatures, or slightly elevated temperatures. Extreme precaution should be taken in handling this latter reactant. Frequently, epichlorhydrin can be substituted advantageously. Molal ratios of the alkylene oxide to fatty acid radical can be increased over and above the amounts exemplified in the previous example. For instance, instead of the present ratio of 9–1, the molal ratio of 18–1 or 27–1 may be employed, and a ratio in a lower range such as 3–1.

In light of what has been said previously, it becomes apparent that no satisfactory formula can be written for a sulfurized compound prior to oxyalkylation. It is also true that it is difficult to indicate all the points of reaction involved by oxyalkylation, and particularly, by oxyethylation. Although the compounds herein contemplated are properly described as oxyalkylation derivatives of sub-rubbery polymeric sulfur converted polyhydric esters of the kind in which there was originally present at least two detergent-forming acid radicals, each of which contained at least one ethylene linkage, yet it is impossible to present adequate chemical formula or structure. For this reason, the herein contemplated compounds must be so characterized in the appendant claims.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described, may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described.

We desire to point out that the superiority of the reagent or demulsifying agent employed in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The chemical products or compounds herein described constitute the subject-matter of our divisional application Serial No. 530,047, filed April 7, 1944.

Having thus described our invention, what we claim as new and desire to secure by Letters Patent is:

1. A process for breaking petroleum emulsions of the water-in-oil type, characterized by subjecting the emulsion to the action of a demulsifier comprising an oxyalkylated derivative of a sub-rubbery polymeric sulfur-converted polyhydric alcohol ester; said ester having present, prior to sulfurization, at least two detergent-forming monocarboxy acid radicals and each of said acid radicals containing at least one ethylene linkage, and having at least 8 and not more than 32 carbon atoms, the ratio of polyoxyalkylene radicals per acid radical being within the range of 3:1 to 27:1.

2. A process for breaking petroleum emulsions of the water-in-oil type, characterized by subjecting the emulsion to the action of a demulsifier comprising an oxyalkylated derivative of a sub-rubbery polymeric sulfur-converted polyhydric alcohol ester; said ester having present, prior to sulfurization, at least two higher fatty acid radicals and each of said acid radicals containing at least one ethylene linkage; the ratio of polyoxyalkylene radicals per acid radical being within the range of 3:1 to 27:1.

3. A process for breaking petroleum emulsions of the water-in-oil type, characterized by subjecting the emulsion to the action of a demulsifier comprising an oxyalkylated derivative of a sub-rubbery polymeric sulfur-converted polyhydric alcohol ester; said ester having present, prior to sulfurization, at least two higher fatty acid radicals having 18 carbon atoms, and each of said acid radicals containing at least one ethylene linkage; the ratio of polyoxyalkylene radicals per acid radical being within the range of 3:1 to 27:1.

4. A process for breaking petroleum emulsions of the water-in-oil type, characterized by subjecting the emulsion to the action of a demulsifier comprising an oxyalkylated derivative of a sub-rubbery polymeric sulfur-converted polyhydric alcohol ester; said ester having present, prior to sulfurization, at least two higher fatty acid radicals having 18 carbon atoms and each of said acid radicals containing one ethylene linkage; the ratio of polyoxyalkylene radicals per acid radical being within the range of 3:1 to 27:1.

5. A process for breaking petroleum emulsions of the water-in-oil type, characterized by subjecting the emulsion to the action of a demulsifier comprising an oxyethylated derivative of a sub-rubbery polymeric sulfur-converted polyhydric alcohol ester; said ester having present, prior to sulfurization, at least two higher fatty acid radicals having 18 carbon atoms and each of said acid radicals containing acid radicals containing one ethylene linakge; the ratio of polyoxyethylene radicals per acid radical being within the range of 3:1 to 27:1.

6. A process for breaking petroleum emulsions of the water-in-oil type, characterized by subjecting the emulsion to the action of a demulsifier comprising an oxyethylated derivative of a sub-rubbery polymeric sulfur-converted glyceride; said glyceride having present, prior to sulfurization, at least two monoethylenic higher fatty acid radicals containing 18 carbon atoms; the ratio of polyoxyethylene radicals per acid radical being within the range of 3:1 to 27:1.

7. A process for breaking petroleum emulsions of the water-in-oil type, characterized by subjecting the emulsion to the action of a demulsifier comprising an oxyethylated derivative of a sub-rubbery polymeric sulfur-converted ricinoleic acid glyceride.

8. A process for breaking petroleum emulsions of the water-in-oil type, characterized by subjecting the emulsion to the action of a demulsifier comprising an oxyethylated derivative of a sub-rubbery polymeric sulfur-converted oleic acid glyceride.

9. A process for breaking petroleum emulsions of the water-in-oil type, characterized by subjecting the emulsion to the action of a demulsifier comprising an oxyethylated derivative of a sub-rubbery polymeric sulfur-converted erucic acid glyceride.

MELVIN DE GROOTE.
BERNHARD KEISER.